(12) United States Patent
Arnold et al.

(10) Patent No.: US 7,227,755 B1
(45) Date of Patent: Jun. 5, 2007

(54) INTEGRATED POWER SUPPLY AND PLATFORM FOR MILITARY RADIO

(75) Inventors: Ken Arnold, Huntsville, AL (US); Michael Samuel Hamilton, Harvest, AL (US); Frank N. Perkins, III, Huntsville, AL (US); Hubert Sims, Jr., Huntsville, AL (US); Jeffrey K. Taylor, Joppa, AL (US); Robert A. Walls, Madison, AL (US)

(73) Assignee: Perkins Technical Services, Inc., Huntsville, AL (US)

( * ) Notice: Subject to any disclaimer, the term of this patent is extended or adjusted under 35 U.S.C. 154(b) by 562 days.

(21) Appl. No.: 10/895,683

(22) Filed: Jul. 21, 2004

Related U.S. Application Data

(63) Continuation of application No. 10/017,411, filed on Dec. 14, 2001, now Pat. No. 6,784,570.

(51) Int. Cl.
*H05K 7/00* (2006.01)
(52) U.S. Cl. ............... 361/729; 361/752; 361/800; 307/43
(58) Field of Classification Search ................ 361/729, 361/800, 752, 797; 320/107–115; 439/131, 439/119; 307/43, 105
See application file for complete search history.

(56) References Cited

U.S. PATENT DOCUMENTS

| 4,882,655 | A | * | 11/1989 | Pavie ........................... 361/726 |
| 5,604,663 | A | * | 2/1997 | Shin et al. ................... 361/686 |
| 5,627,450 | A | | 5/1997 | Ryan et al. ................... 320/15 |
| 5,966,285 | A | * | 10/1999 | Sellers ......................... 361/686 |
| 6,191,553 | B1 | | 2/2001 | Feng-Jung ................... 320/113 |
| 6,272,016 | B1 | * | 8/2001 | Matonis et al. .............. 361/716 |
| 6,975,511 | B1 | * | 12/2005 | Lebo et al. .................. 361/703 |

* cited by examiner

*Primary Examiner*—Tuan Dinh
*Assistant Examiner*—Hung S. Bui
(74) *Attorney, Agent, or Firm*—Russell Carter Gache; Sirote & Permutt, P.C.

(57) ABSTRACT

An adapter assembly including a base for supporting a SINCGARS radio and a radio frequency power amplifier, a first connector for electrically connecting with the SINCGARS radio and a second connector for electrically connecting with the power amplifier, a first power supply electrically connected with the first connector and a second power supply and a third power supply, the second power supply and the third power supply each being electrically connected with the second connector.

42 Claims, 4 Drawing Sheets

INTEGRATED POWER SUPPLY AND PLATFORM FOR MILITARY RADIO

This application is a continuation in part of U.S. Ser. No. 10/017,411, filed Dec. 14, 2001 now U.S. Pat. No. 6,784,570 and incorporated herein in its entirety by reference.

FIELD OF THE INVENTION

The present invention relates generally to an integrated power supply and docking platform. In particular, the present invention relates to an integrated power supply and docking platform for a radio and a radio frequency power amplifier, for forming a single physical platform with integrated power electronics.

BACKGROUND OF THE INVENTION

The U.S. Department of Defense employs a type of VHF-FM combat net radio known as the Single Channel Ground and Airborne Radio System (SINCGARS). SINCGARS radios, such as the RT-1523 series radio, are designed to provide the primary means of tactical communications and control for U.S. ground mounted and dismounted units, all in coordination with naval and air support. SINCGARS radios are designed on a modular basis for achieving maximum commonality among the various ground airborne system configurations of the armed forces. SINCGARS radios provide U.S. military commanders with a highly reliable, secure, and easily maintainable tactical radio net.

SINCGARS radios possess a nominal input power requirement of 11 to 16 volts direct current, which is supplied by rechargeable on-board batteries. Recharging the SINCGARS radio batteries is inconvenient and, in certain mission applications, unattainable. Currently, specialized and complex battery recharging systems are available for recharging SINCGARS radio batteries; however, these systems are not always operable in a given application.

SUMMARY OF THE INVENTION

In a first embodiment, the present invention is directed to an adapter assembly including a base having a front side and a back side, the base being adapted and arranged for supporting a SINCGARS radio and a power amplifier adapted to amplify the radio frequency output of the SINCGARS radio; a first connector adapted and arranged for electrically connecting with the SINCGARS radio; a second connector adapted and arranged for electrically connecting with the radio frequency power amplifier; a first power supply electrically connected with the first connector, the first power supply being housed within the assembly and, a second power supply and a third power supply, the second power supply and the third power supply each being electrically connected with the second connector and housed within the assembly.

In another embodiment, the present invention is directed to an adapter assembly including a base having a front side and a back side, the base being adapted and arranged for supporting a SINCGARS radio and radio frequency power amplifier; a first member extending upward from the base; a second member extending upward from the base; a plurality of power supplies housed within at least part of the assembly; a first connector supported by the first member, the first connector being adapted and arranged for supplying power from at least one of the plurality power supplies to the SINCGARS radio; a second connector supported by the second member, the second connector being adapted and arranged for supplying power from at least two of the plurality of power supplies to the radio frequency power amplifier, and a speaker supported by the base.

In yet another embodiment, the present invention is directed to an adapter assembly including a base having a front side and a back side, the base being adapted and arranged for supporting a SINCGARS radio; a first member extending upward from the back side of the base; a first forward facing connector supported by the first member and adapted to engage a complementary connector of the SINCGARS radio; a first power supply in electrical connection with the first forward facing connector, and a speaker supported by the base.

Other features, objects and advantages of the present invention will become apparent from a reading of the following description as well as a study of the appended drawings.

BRIEF DESCRIPTION OF THE DRAWINGS

A power supply platform incorporating the features of the invention is depicted in the attached drawings which form a portion of the disclosure and wherein.

DESCRIPTION OF THE PREFERRED EMBODIMENTS

Figure 1:
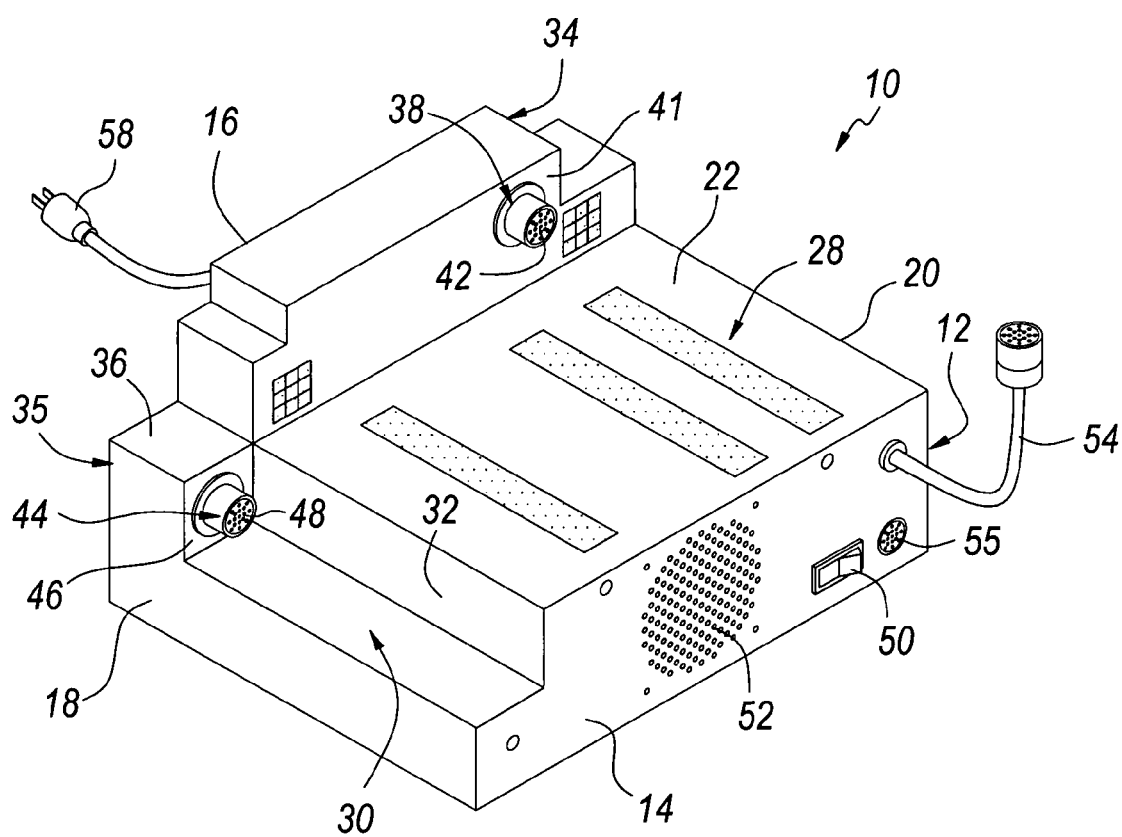
FIG. 1 is a perspective view of the presently preferred embodiment of the present invention.
Figure 2:
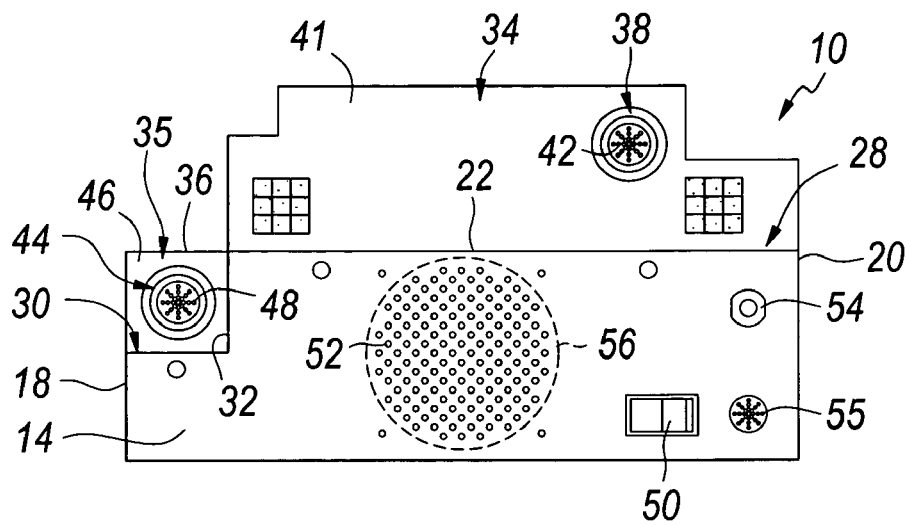
FIG. 2 is a front elevation view of the invention of FIG. 1.
Figure 3:
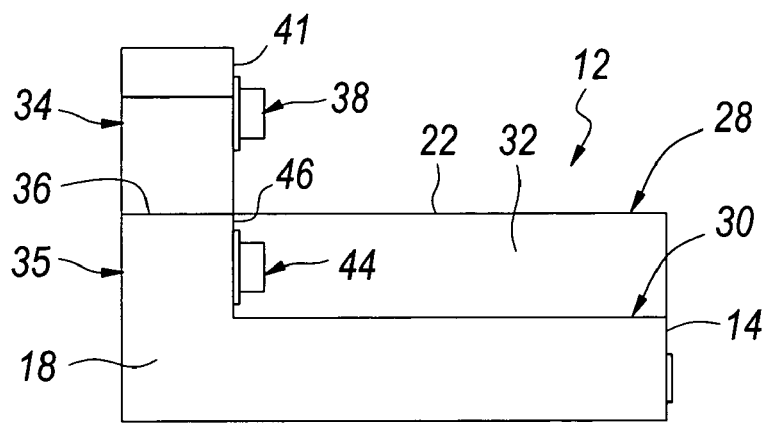
FIG. 3 is a side elevation view of the invention of FIG. 1.
Figure 4:
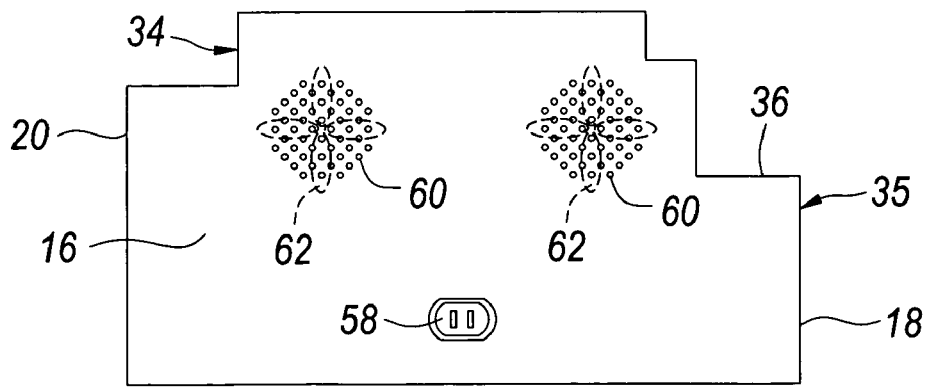
FIG. 4 is a back elevation view of the invention of FIG. 1.

The preferred embodiment of the present invention is illustrated in FIGS. 1-6, where like portions share like numbering. As illustrated at FIGS. 1 through 4, an adapter assembly 10, in accordance with the presently preferred embodiment, includes a base 12 having a front side 14, a back side 16, opposing lateral sides 18 and 20 and a top side 22. Top side 22 is adapted to simultaneously support a SINCGARS radio 24 and a radio frequency power amplifier ("RFPA") 26 adjacent to one another. To that end, top side 22 includes a substantially flat, horizontal first platform 28 for supporting SINCGARS radio 24 and a lower, substantially flat, horizontal second platform 30 for supporting RFPA 26. First platform 28 and second platform 30 are offset with second platform 30 being positioned slightly below first platform 28 and connected thereto by a vertical, medial side 32.

Extending upward from top side 22 at a 90 degree angle and forming a portion of backside 16 are a pair of adjacent support structures for further supporting SINCGARS radio 24 and RFPA 26. More particularly, the support structures include a vertical first support 34 extending upward from first platform 28 and having a width corresponding to the width of first platform 28 and a vertical second support 35 extending upward from second platform 30 and having a width corresponding to the width of second platform 30. A top surface 36 of second support 35 lies in a plane formed by first platform 28.

A first electrical connector 38 is positioned on a forward face 41 of first support 34 and arranged thereon so that first connector 38 is in alignment and capable of interfacing with a complementary receptor socket on the rear of SINCGARS radio 24, when radio 24 is installed on first platform 28. A suitable connector for use as first electrical connector 38 is a 14 pin radio connector type manufactured under the part number A3012769-1 by WPI Interconnect Products, Inc. of Salem, N.J. 08079 (aka "Wire Pro") and having an NSN (i.e. a national stock number or a military part number) of 5935-01-123-07052. Receptor contacts 42 are positioned within first connector 38 to receive corresponding male connectors extending within the complementary receptor socket on the rear side of SINCGARS radio 24 in accordance with government specifications established for SINCGARS radios.

A second electrical connector 44 is positioned on a forward face 46 of second support 35. A suitable connector for use as second electrical connector 44 is a 26 pin radio type connector manufactured under part number A3012763-2 by WPI Interconnect Products, Inc. of Salem, N.J. 08079 (aka "Wire Pro") and having an NSN (i.e. a national stock number or military part number) of 5935-01-298-4991. Second connector 44 is positioned on face 46 so that second connector 44 is in alignment with a complementary receptor socket on the rear of RFPA 26 when installed on second platform 30. Receptor contacts 48 are positioned within second connector 44 to receive corresponding male connectors extending within the complementary receptor socket on the rear side of RFPA 26 in accordance with government specifications established for SINCGARS radios and SINCGARS radio frequency power amplifiers.

A control switch 50 is provided on front side 14 of base 12 for controlling the initiation of power and/or charging for SINCGARS radio 24 and RFPA 26 when they are installed on adapter assembly 10. Front side 14 further includes a set of speaker access holes 52 and a microphone adapter 54. The set of speaker access holes 52 allows sound generated by a speaker 56 housed within base 12 to exit base 12, while microphone adapters 54, 55 provide a means of connecting the input/output of a SINCGARS radio handset to speaker 56 to allow microphone in and microphone out signals to be transmitted to an audio amplifier circuit 74 and ultimately to speaker 56.

Opposite front side 14, a standard power plug 58 is supported within back side 16 and is adapted to plug into a standard 110/220 volt household outlet via an electrical cord. Backside 16 further includes a pair of fan access holes 60 to allow a flow of air through base 12 as generated by a pair of fans 62.

Figure 5:
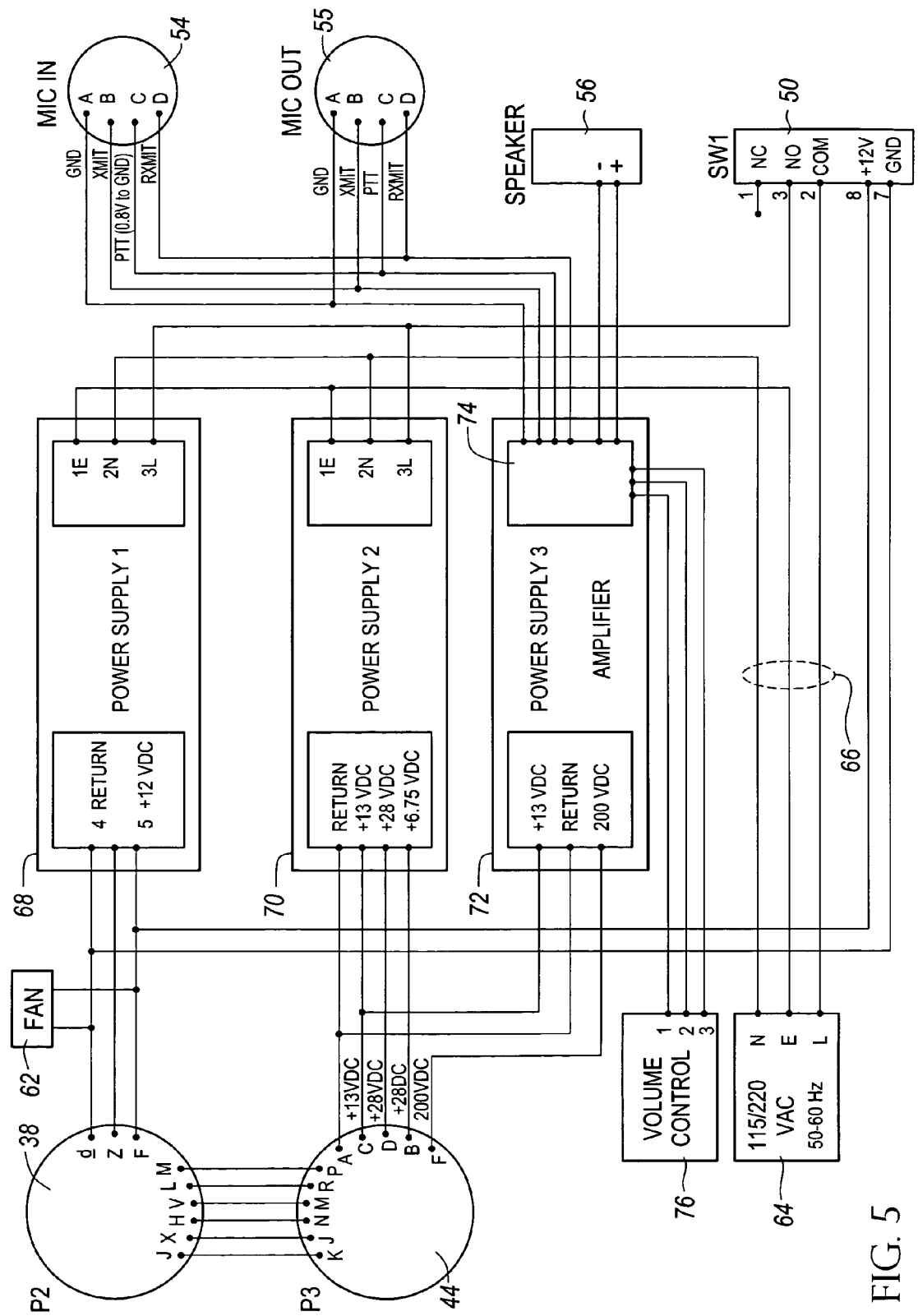
FIG. 5 is an electrical wiring diagram of the invention of FIG. 1.

Referring now to FIG. 5, the preferred embodiment of the invention includes a power supply subsystem for converting standard household 110/220 Volt alternating current into direct current and supplying it to first connector 38 as +12 Volt direct current and to second connector 44 as +13 Volt direct current, +28 Volt direct current, +6.75 Volt direct current and +200 Volt direct current. More particularly, power plug 58 supplies input power to a receiving connector 64 which is connected via internal wiring 66 to control switch 50. When control switch 50 is closed, a first power supply 68 converts alternating current power into direct current power at voltage levels required for SINCGARS radio 24, i.e., +12 Volt direct current, and outputs the converted power to first connector 38 to allow for powering of SINCGARS radio 24 when installed or docked onto adapter assembly 10. A suitable power supply for first power supply 68 is a MAP55-1012 power supply manufactured by Power-One located in Camarillo, Calif. A second power supply 70 is provided for converting alternating current power into direct current power for powering RFPA 26. Thus, when control switch 50 is closed, second power supply 70 converts 110/120 Volts alternating current into +13 Volts direct current, +28 Volts direct current and +6.75 Volts direct current, which power is directed to second connector 44 for powering RFPA 26 when installed on adapter assembly 10. A portion of the +13 Volts direct current is used to supply power to a third power supply 72.

Third power supply 72 converts the +13 Volts direct current into +200 Volts direct current, which is directed to second connector 44 for further powering RFPA 26 when installed on adapter base 10. Third power supply 72 consists of two functional units, a +13V to +200V power supply and an audio amplifier circuit 74 electrically connected between a volume control 76, speaker 56 and microphone adapters 54, 55. Third power supply 72 is an isolated discontinuous flyback converter design operating at 20 kHz and utilizing a MIC38C45 PWM controller manufactured by Micrel, Inc. in San Jose, Calif. Third power supply 72 supply uses a 24:400 step up transformer to boost the +13 volt input to +200 volts under a load of up to 10 mA. The design is output limited at 2W to protect the internal transformer and FET (Field Effect Transistor) from over current damage. A feedback control network is also utilized with an internal +5 Volt reference to regulate the output voltage.

Audio amplifier circuit 74 is design with a +5 watt audio amplifier IC LM384N manufactured by National Semiconductor. Audio amplifier circuit 74 acts as a power amplifier and relay for electrical signals generated by the SINCGARS radio handset 60 when connected via microphone adapters 54, 55. In this manner, communications exchanged through the handset can be heard via speaker 56 and the volume thereof controlled by volume 76. Further, the design of audio amplifier circuit 74 provides a power boost of 34 db maximum and operates off a +13 Volt input supply. The output is short circuit protected and to reduce distortion the output is frequency limited by a low pass output filter. The output level is controlled via a 10k ohm resistor mounted on the front of the unit.

Inasmuch as power supply conversions and power switch wiring are well-known in the electrical arts, further discussion as to the electrical characteristics and properties of the internal power supplies for converting standard 110/220 volt AC into direct current will not be discussed as they are not necessary for a complete understanding of the invention herein described.

Figure 6:
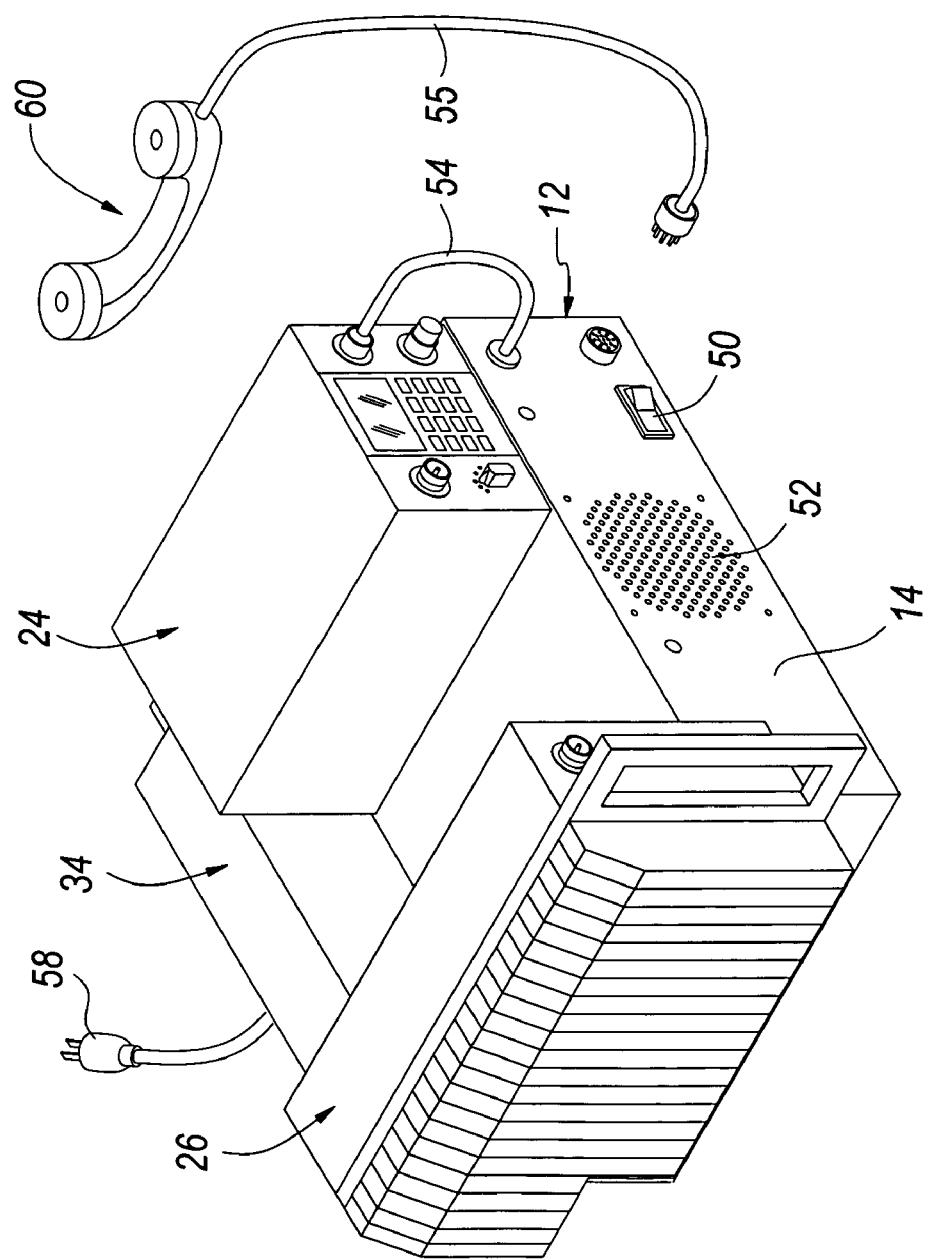
FIG. 6 is perspective view of the invention of FIG. 1 showing a SINCGARS radio and a radio frequency power amplifier supported thereon.

Referring now to FIG. 6, it may be seen that the adaptor assembly 10 supports a RFPA 26 on the left side of the assembly at a lower level than the member supporting the SINCGARS radio 24 positioned on the rights side of the adaptor. An adapter line 54 connects the input/output of the SINCGARS radio 24 handset line to the adaptor assembly 10 and internal microphone electronics 74, and line 55 connects radio handset 60 with the adaptor assembly 10 to allow the transmission of voice communications (i.e. audio signals) to and from the handset. Additional electrical communications also occur between the RFPA 26 and the SINCGARS radio 24 via connectors 38 and 44 (see FIG. 5). The combination of the engaged RFPA 26, the SINCGARS radio 24, and the adapter lines 54, 55 on the adaptor 10 allow for the powering and boosting of transmission signals from the SINCGARS radio 24 while allowing others in the vicinity of the adaptor unit 10 to hear incoming and outgoing voice transmissions.

While I have shown my invention in one form, it will be obvious to those skilled in the art that it is not so limited but is susceptible of various changes and modifications without departing from the spirit thereof. For example, various plug placements on the rear member of the invention as well as various types of socket structures can easily be anticipated to accommodate upgrades and modifications to the current SINCGARS radios used by the Armed Forces. Moreover, the height of the rear member and orientation of the electrical plug on the rear of the invention could easily be varied to accommodate different types of radio configurations. In general, it is contemplated that the invention would be varied in its physical dimensions to meet various types of SINCGARS radio configurations exist, such as those in existing model numbers: Ground ICOM radios using receiver-transmitter (RT) RT-1523, RT-1523A, RT-1523B, RT1523C, RT-1523D, and RT-1523E; receiver-transmitter RT-1523 series AN/VRC-87A/D/F through AN/VRC-92A/D/F, and AN/PRC-119 SINCGARS, SINCGARS ASIP.

Having set forth the nature of the present invention, what is claimed is:

1. An adapter assembly comprising,
   a. a base having a front side and a back side, said base being adapted and arranged for supporting a SINCGARS radio and a power amplifier adapted to amplify said radio frequency output of said SINCGARS radio,
   b. a first connector adapted and arranged for electrically connecting with said SINCGARS radio,
   c. a second connector adapted and arranged for electrically connecting with said power amplifier,
   d. a first power supply electrically connected with said first connector, said first power supply being housed within said assembly and,
   e. a second power supply and a third power supply, said second power supply and said third power supply each being electrically connected with said second connector and housed within said assembly.

2. The assembly according to claim 1 wherein said first power supply and said second power supply each includes a DC power converter for converting 110/220 alternating current into direct current.

3. The assembly according to claim 2 wherein said DC power converter of said first power supply converts 110/220 alternating current into +12 Volt direct current and said DC power converter of said second power supply converts 110/220 alternating current into +13 Volt direct current, +28 Volt direct current and +6.75 Volt direct current.

4. The assembly according to claim 1 wherein said third power supply converts +13 Volt direct current into +200 Volt direct current.

5. The assembly according to claim 1 further comprising a first member extending upward from said base, said first member supporting said first connector.

6. The assembly according to claim 1 further comprising a second member extending upward from said base, said second member supporting said second connector.

7. The assembly according to claim 5 wherein said first member extends upward from said back side of said base.

8. The assembly according to claim 6 wherein said second member extends upward from said back side of said base.

9. The assembly according to claim 1 further comprising a first member extending upward from said base, said first member supporting said first connector, and a second member extending upward from said base, said second member supporting said second connector.

10. The assembly according to claim 9 wherein said first member and said second member extend upward from said backside of said base.

11. The assembly according to claim 1 further comprising a speaker integral with said base, said speaker being in electrical connection with an audio amplifier circuit of said third power supply.

12. The assembly according to claim 11 wherein said speaker is supported by said front side of said base.

13. The assembly according to claim 11 wherein a volume control is electrically connected with said audio amplifier circuit.

14. The assembly according to claim 11 wherein said audio amplifier circuit includes means for electrically connecting with an external microphone.

15. The assembly according to claim 1 further including at least one fan in electrical connection between said first connector and said first power supply.

16. The assembly according to claim 1 wherein said base is substantially rectangular.

17. The assembly according to claim 1 further comprising said SINCGARS radio and said amplifier being electrically connected with said first connector and said second connector, respectively.

18. The assembly according to claim 1 wherein said base includes low friction runners for arresting movement of said SINCGARS radio and said amplifier.

19. The assembly according to claim 11 wherein said first power supply includes a first DC power connector and said second power supply includes a second DC power converter, said first DC power being adapted to convert 110/220 alternating current into +12 Volt direct current and said second DC power converter being adapted to convert 110/220 alternating current into +13 Volt direct current, +28 Volt direct current and +6.75 Volt direct current.

20. The assembly according to claim 19 wherein said third power supply is adapted to convert +13 Volt direct current into +200 Volt direct current.

21. An adapter assembly comprising,
   a. a base having a front side and a back side, said base being adapted and arranged for supporting a SINCGARS radio and radio frequency power amplifier,
   b. a first member extending upward from said base,
   c. a second member extending upward from said base,
   d. a plurality of power supplies housed within at least part of said assembly,
   e. a first connector supported by said first member, said first connector being adapted and arranged for supplying power from at least one of said plurality power supplies to said SINCGARS radio, and
   f. a second connector supported by said second member, said second connector being adapted and arranged for supplying power from at least two of said plurality of power supplies to said radio frequency power amplifier.

22. The assembly according to claim 21 wherein said first member and said second member extend upward from said back side of said base.

23. The assembly according to claim 21 further including a speaker supported by said front side of said base.

24. The assembly according to claim 21 wherein said first connector includes a forward facing electrical mounting interface adapted to engage a complementary connector of said SINCGARS radio.

25. The assembly according to claim 21 wherein said second connector includes a forward facing electrical mounting interface adapted to engage a complementary connector of said radio frequency power amplifier.

26. The assembly according to claim 21 wherein said first connector includes a forward facing electrical mounting interface adapted to engage a complementary connector of said SINCGARS radio and said second connector includes a forward facing electrical mounting interface adapted to engage a complementary connector of said radio frequency power amplifier.

27. The assembly according to claim 21 wherein said base is substantially rectangular.

28. The assembly according to claim 21 wherein said base includes low friction runners for arresting movement of said SINCGARS radio and said radio frequency power amplifier.

29. The assembly according to claim 21 further comprising an audio amplifier circuit in electrical connection between said speaker, second connector and a volume control.

30. The assembly according to claim 26 wherein said first member and second member extend upward from said backside of said base.

31. The assembly according to claim 21 wherein said at least one of said plurality of power supplies and one of said at least two of said plurality of power supplies each includes a DC power converter for converting 110/220 alternating current into direct current and wherein said other one of said at least two of said plurality of power supplies includes a power converter for converting +13 Volt direct current into +200 Volt direct current.

32. The assembly according to claim 21 further comprising said SINCGARS radio and said radio frequency power amplifier being electrically connected with said first connector and second connector, respectively.

33. An adapter assembly comprising,
 a. a base having a front side and a back side, said base being adapted and arranged for supporting a SINCGARS radio,
 b. a first member extending upward from said back side of said base,
 c. a first forward facing connector supported by said first member and adapted to engage a complementary connector of said SINCGARS radio,
 d. a first power supply in electrical connection with said first forward facing connector, and
 e. a means for converting audio electric signals into audibly detectable sounds, wherein said means is supported by said base.

34. The adapter assembly according to claim 33 wherein said base is further adapted and arranged to support a radio frequency power amplifier.

35. The adapter assembly according to claim 34 further comprising a second forward facing connector supported by a second member and adapted to engage a complementary connector of said radio frequency power amplifier.

36. The adapter assembly according to claim 35 further comprising a second power supply in electrical connection with said second forward facing connector.

37. The assembly according to claim 36 further comprising a third power supply in electrical connection with said second forward facing connector.

38. The assembly according to claim 37 wherein said third power supply includes an audio amplifier circuit in electrical connection between a volume control and said speaker.

39. The assembly according to claim 38 wherein said audio amplifier circuit includes means for electrically connecting with a microphone assembly.

40. The assembly according to claim 39 wherein said first power supply includes a first DC power converter adapted to convert alternating current into about +12 Volt direct current, said second power supply includes a second DC power converter adapted to convert alternating current into about +13 Volt direct current, about +28 Volt direct current and about +6.75 Volt direct current and said third power supply includes a power converter adapted to convert about +13 Volt direct current into about +200 Volt direct current.

41. The assembly according to claim 33 further comprising said SINCGARS radio electrically connected with said first power supply.

42. The assembly according to claim 34 further comprising said SINCGARS radio connected with said first connector and said radio frequency power amplifier connected with said second connector.

\* \* \* \* \*